United States Patent [19]
Biewer

[11] 3,815,846
[45] June 11, 1974

[54] SELF-LEVEL WIND
[75] Inventor: Frank N. Biewer, San Diego, Calif.
[73] Assignee: Offshore Technology Corp., Escondido, Calif.
[22] Filed: Jan. 10, 1973
[21] Appl. No.: 322,515

[52] U.S. Cl............................ 242/158 R, 242/157.1
[51] Int. Cl.............................................. B65h 54/28
[58] Field of Search...... 242/158 R, 158.2, 158.4 R, 242/157.1, 158 F

[56] References Cited
UNITED STATES PATENTS
3,152,773   10/1964   Brown.............................. 242/157.1
3,456,899   7/1969   Smith et al..................... 242/158 R FOREIGN PATENTS OR APPLICATIONS
1,126,871   7/1956   France............................ 242/158 R
896,783   11/1953   Germany....................... 242/158.4 R
1,094,425   12/1960   Germany....................... 242/158.4 R Primary Examiner—Stanley N. Gilreath
Attorney, Agent, or Firm—Brown & Martin

[57] ABSTRACT

A self-level wind for a line that employs a shiftable carriage, the carriage including rollers for guiding the line toward sensing mechanism. The sensing mechanism follows the shifting of the rollers as the line is being wound upon a spool. The sensing mechanism controls strain-responsive means, which means control a motor that shifts the carriage.

9 Claims, 6 Drawing Figures

SELF-LEVEL WIND

BACKGROUND OF THE INVENTION

1. Field of the Invention: The invention is directed to self-leveling winds.

2. Description of the Prior Art:

Most of the level winds are of the type employing a lead screw having spiral grooves cut at cross angles to provide a bi-directional screw. These grooves are cut to accept limited gauge wires. A wire diameter will change when used as it becomes stretched or worn. Therefore, the wire becomes "out of time." Consequently, a new wire must be substituted and provisions such as a clutch or changed gearing must be employed to retime the level wind.

SUMMARY OF THE INVENTION

The self-level wind for winding a line in superimposed layers includes a frame that carries a shiftable carriage. The carriage includes two guides that direct the line to a sensing mechanism which affects a strainresponsive means. The variations in potential of the strain-responsive means control a motor for shifting the carriage so that it causes the line to be properly wound in layers on a spool.

Other features and the advantages of the present invention will be apparent from the following description, reference being made to the accompanying drawings wherein a preferred embodiment of the invention is illustrated.

DESCRIPTION OF THE PREFERRED EMBODIMENT

A spool 20 in the form of a winch spool is supported on a floor 22. The spool includes an elongated core 24 and side flanges 26. The line is shown at 28.

Figure 3:
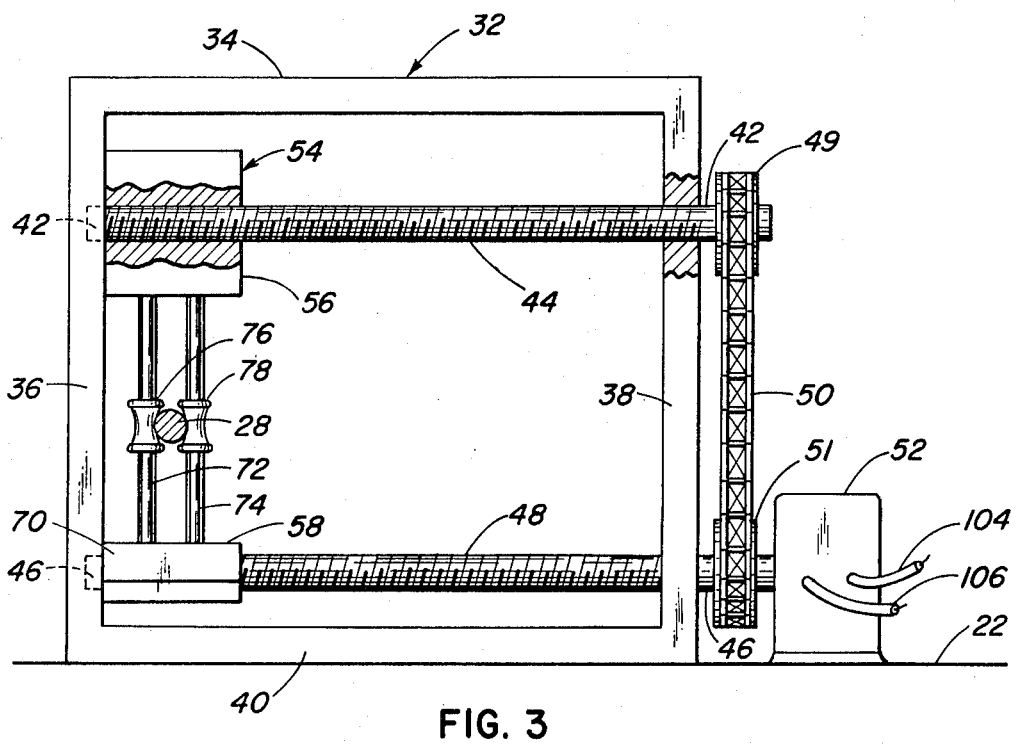
FIGS. 3 and 4 are views looking in the direction of arrows 3 and 4, respectively, of FIG. 2.
Figure 4:
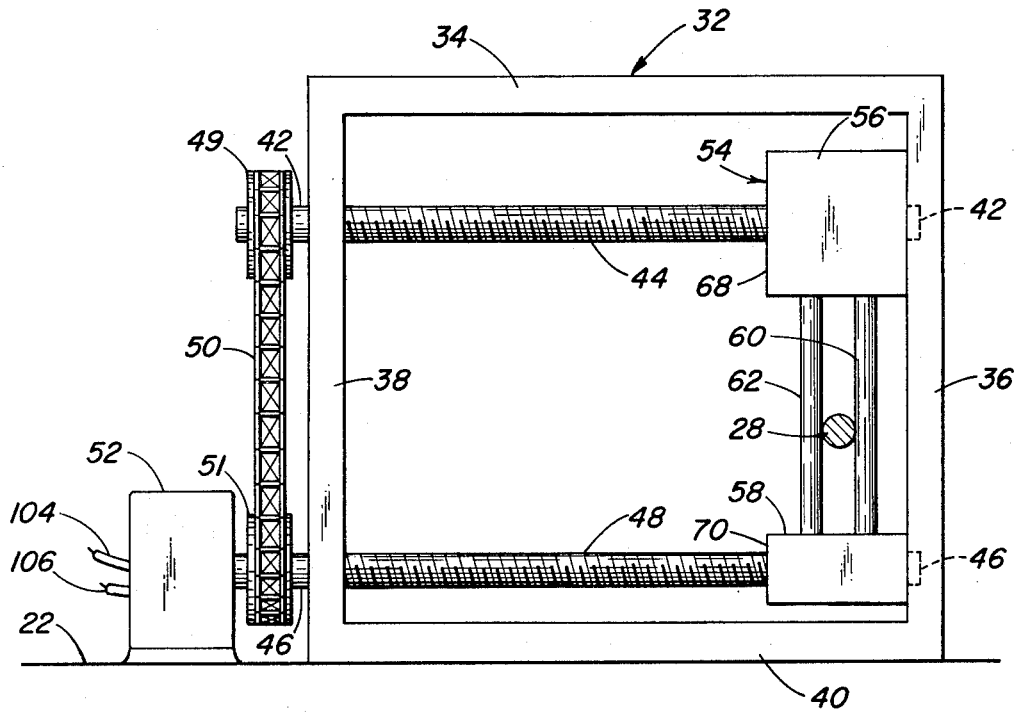

A frame 32 includes a top section 34, forwardly extending side sections 36 and 38 and a bottom 40 that rests on the floor 22. The side sections 36 and 38 form suitable bearings for a shaft 42. The shaft is threaded as at 44 to form a screw. As seen more clearly in FIGS. 3 and 4, the lower sections of the side sections 36 and 38 form bearings for a shaft 46. This shaft is threaded to form a screw 48. The shafts 42 and 46 carry sprockets 49 and 51, respectively, and these sprockets are connected with one another by an endless chain 50. A bi-directional rotatable motor 52 drives shaft 46 and shaft 42 in unison through the chain 50.

A carriage 54 includes an upper section 56 and a lower section 58. Two vertically extending rollers 60 and 62 are journaled for rotation in the sections 56 and 58. As viewed in FIG. 3, the upper section 56 carries a forwardly extending I-beam 64, the web 66 thereof extending horizontally. The lower section 58 of the carriage 54 extends forwardly and carries a support 70. The upper portions of shafts 72 and 74 are fixed to the side of the front portion of I-beam 64 and the lower portions of these shafts are fixed to the support 70. Shafts 72 and 74 carry sensing members in the form of spools 76 and 78, respectively.

In practicing the invention, the end of the line 28 is threaded between the rear rollers 60 and 62 and between the spools 76 and 78 and then fastened to the spool 20. Upon winding of the spool 20, the rollers 60 and 62 tend to align the line 28 with the spools 76 and 78. The winding of the spool biases the carriage 54 in one direction when the line travels across the spool 20 in one direction, and biases the carriage 54 in the opposite direction when the line travels across the spool 20 in the opposite direction. These biasings bias the spools 76 and 78 and such biasing of those spools biases the web 66 which affects the potential of a strain gauge.

Figure 1:
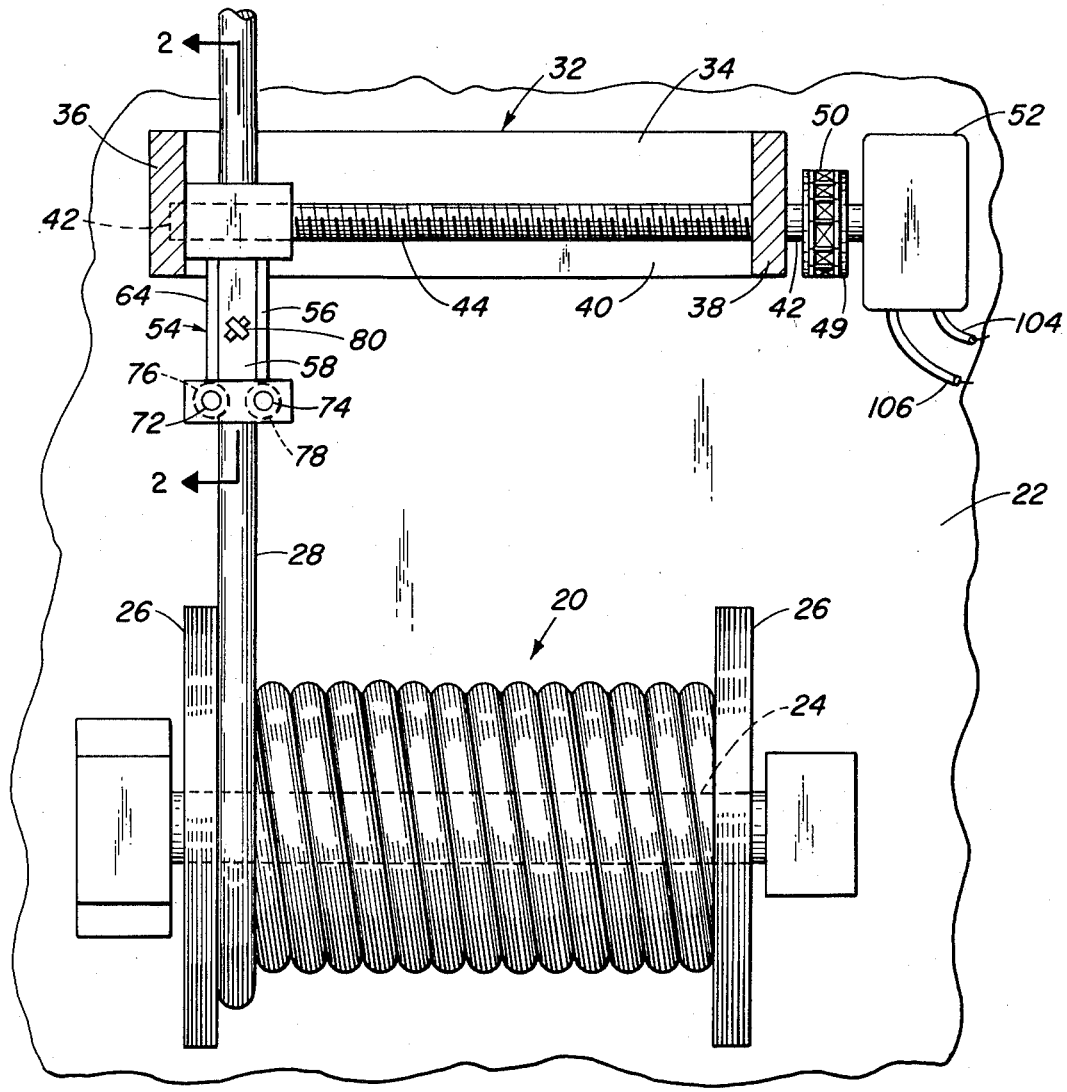
FIG. 1 is a top plan view of the spool having a line wound thereon.
Figure 5:
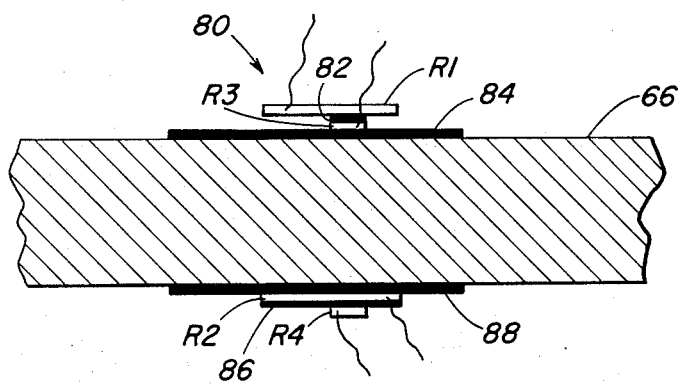
FIG. 5 is a fragmentary, schematic view of a web of an I-beam employed on the carriage showing the strain gauges insulated from one another.
Figure 2:
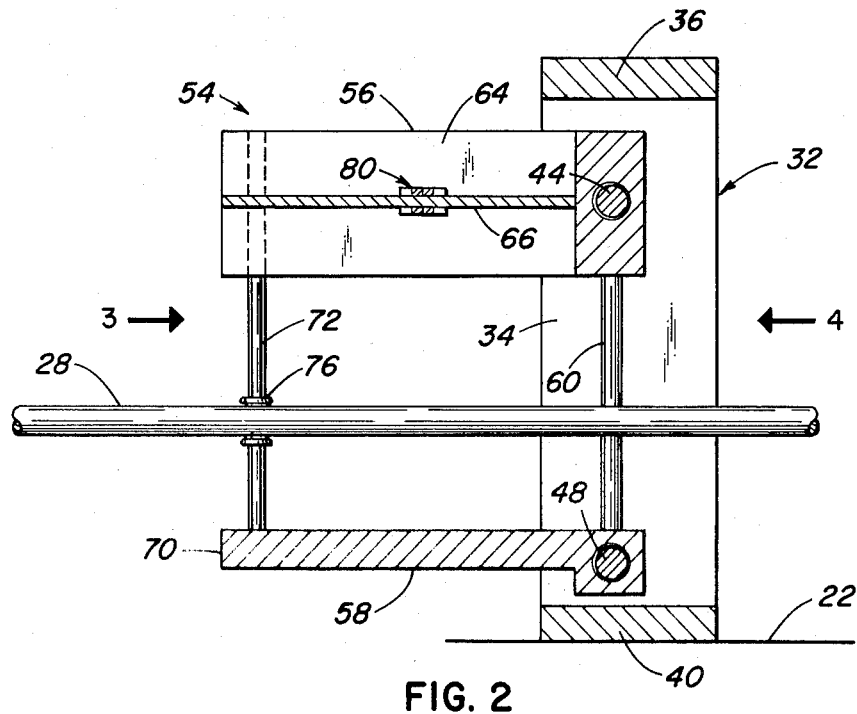
FIG. 2 is a sectional view taken along line 2—2 of FIG. 1.

The strain gauge is in the form of a Wheatstone bridge 80. Two of the resistances of the bridge are suitably fixed on one side of the web 66 of the I-beam 64 and the other two are suitably fixed on the opposite side of the web. These resistances, in actual practice, are in the form of foil-type strain gauges. The pairs of srain gauges are mounted at an angle of 45° relative to the axis of the beam and at an angle of 90° relative to each other. For illustrative purpose (see FIG. 5), the resistances $R^1$ and $R^3$ are insulated from one another and from the webs by insulators 82 and 84, respectively, and resistances $R^2$ and $R^4$ are insulated from one another and from the web by insulators 86 and 88.

Figure 6:
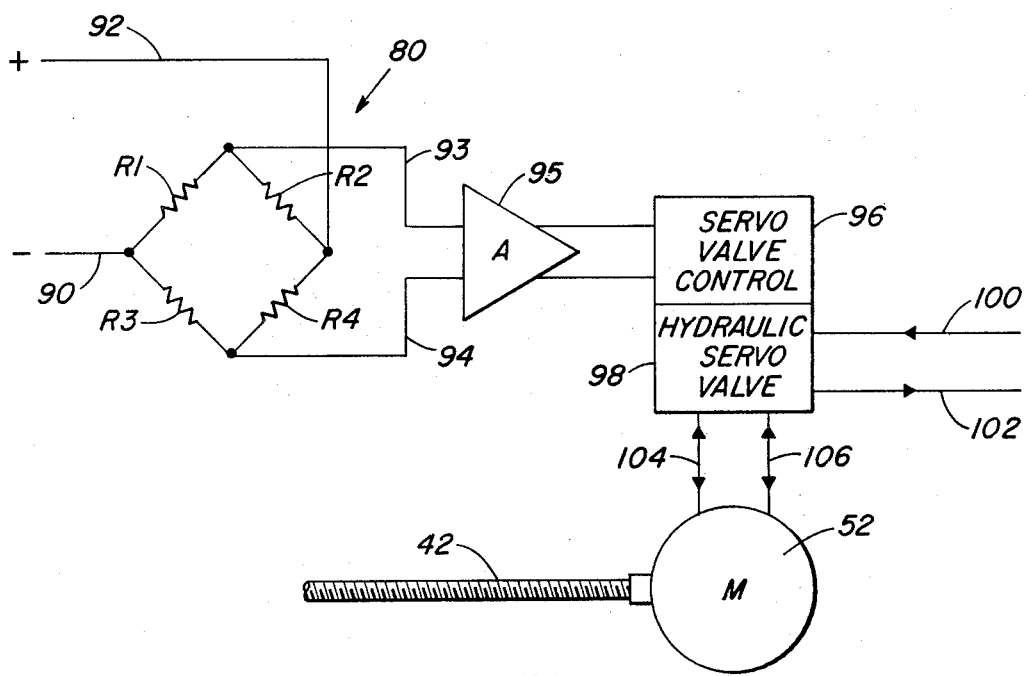
FIG. 6 is a schematic view of the strain gauge in the form of a Wheatstone bridge, and the mechanism cotrolled by the gauge including the bi-directional rotatable motor.

Referring to the schematic view of FIG. 6, the Wheatstone bridge 80 has its resistances $R^1$ and $R^3$ connected to the negative side 90 of a source of current, and its resistances $R^2$ and $R^4$ connected with the positive side 92 of the source of current. If resistances $R^1$, $R^2$, $R^3$ and $R^4$ are equal, the bridge is balanced and there is no output voltage. If, however, the resistances of $R^1$ and $R^4$ are increased and the resistances of $R^3$ and $R^2$ are decreased, there will be a voltage indication across the output conductors 93 and 94 with conductor 93 positive and conductor 94 negative. If the opposite occurs, i.e., $R^1$ and $R^4$ decrease in resistance and $R^3$ and $R^2$ increase, there is also an output voltage, but the polarity is now reversed with conductor 94 positive and conductor 93 negative. The voltage at the output terminals is directly related to the change in the resistances.

One side of an amplifier 95 is connected to the junction of $R^1$ and $R^2$ and the other side to the junction of $R^3$ and $R^4$. The amplifier 95 is connected to a servo valve control 96, which latter controls a hydraulic servo valve 98, as is well known in the art. Hydraulic fluid is delivered to and from the servo valve 98 by tubes 100 and 102, respectively. The bidirectional motor 52 is connected to the servo valve 98 by two tubes 104 and 106.

Biasing of the spool 76 affects the potential of the Wheatstone bridge so that current flows in one direction to the servo valve control 96 and biasing of the spool 78 affects the potential of the Wheatstone bridge so the current flows in the opposite direction to the servo valve control. Current flowing in one direction in the control 96 controls the hydraulic servo valve 98 so that fluid flows from the valve 98 to the motor 52 through the tube 104 and from the motor to valve 98 through the tube 106, whereby the bi-directional motor turns the screws 44 and 48 to rotate clockwise. Current flowing in the opposite direction to the servo valve control 96 causes the fluid to flow to the motor 52 in the opposite direction whereby the screws 44 and 48 rotate counterclockwise. In this manner, the line is wound in levels one upon the other.

The length of the rollers 60 and 62 are at least equal to the distance between the periphery of the core 24 of the spool 20 and the peripheries of the side flanges 26 of the spool. Likewise, the length of shafts 72 and 74 are at least equal to the distance between the periphery of the core 24 and the peripheries of the flanges 26. Thus the rollers 60 and 62 provide for guiding the line 28 through the line-receiving area of the spool 20, and the spools 76 and 78 can move up and down as demanded by the height of the line 28 being wound or unwound.

Suitable changes can be made for varying the distances between the confronting surfaces of the rollers 60 and 62 and the confronting surfaces of spools 76 and 78. As an example, different diameter rollers and different diameter spools can be substituted. Thus, when a larger line is substituted for that shown, smaller diameter rollers and spools will be substituted for those shown. These rollers and spools can be readily installed, whereas in the prior art, a different bi-directional lead screw must be substituted, one that accommodates the substituted line.

Since the spools 76 and 78 are readily sensible to movement of the line, then, although the wire is stretched and worn, the demand, through side thrust, is constant; and, therefore, the level wind cannot "get out of time."

Too, the carriage on a bi-directional lead screw is subjected to strains caused by its receiving of the wire at different angles. In accordance with the present invention, such strains are not imparted to the spools 76 and 78, but are absorbed by the rollers 60 and 62. Thus the Wheatstone bridge is not subjected to extraneous pressure due to an angular relationship between the carriage and the line.

There need be no direct mechanical coupling between the spool 20 and the carriage frame 32. Thus the installer of the carriage frame has flexibility in positioning the frame 32.

While not limited to a bi-directional hydraulic motor and since the spool of a winch is usually driven by a hydraulic motor, the bidirectional hydraulic motor is readily applicable to the same hydraulic system.

Thus it is apparent that the device is particularly adaptable to control the winding of a wire or cable for the spool of a winch.

Having described my invention, I claim:

1. A self-level winder for controlling the level wind of a line on a spool having a core and end flanges comprising:
   a shiftable carriage having first and second pairs of rollers mounted on the carriage for receiving and passing the line with each roller of the pair of rollers being spaced from the other roller at a distance substantially equal to the width of the line and disposed on opposite sides of the line and disposed to be shifted by the line as the line is being would on the spool,
   the first and second pairs of rollers being spaced and interconnected by beam means on the carriage with the rollers and beam means aligned with the line and the first pair of rollers being adjacent to the spool, whereby winding of the line on the spool causes side movement of the line exerting a twisting force on the beam means between the pairs of rollers,
   strain gauge circuit means for sensing the strain on the beam means and providing output signals upon the shifting of the rollers in response to movement of the line,
   motor means responsive to the output signals for shifting the carriage and beam means to the desired locations as the line is being wound on thespool,
   and a frame for supporting the carriage and beam means in relative alignment with the spool.

2. A self-level winder as defined in claim 1, characterized in that the beam means comprises a first beam and a second beam,
   and said rollers being secured between said first and second beams.

3. A self-level winder as defined in claim 2, characterized in that the beams are held by the carriage and frame in a given alignment with the spool,
   and the beams are moved with this relative alignment with the carriage across the frame.

4. A self-level winder as defined in claim 3, characterized in that the beams project in spaced relationship from the carriage toward the spool,
   the strain gauge means is connected to one of said beams,
   and the first pair of rollers are on the first end of said beams.

5. A self-level winder as defined in claim 4, characterized in that the other ends of the beams are mounted onto moving members,
   the moving members being secured to the frame,
   and said motor means moving the moving members.

6. A self-level winder as defined in claim 5, characterized in that the movable members comprise threaded shafts that threadably engage the respective ends of the beams holding the beams in rigid alignment relative thereto,
   and said movable members being rotated by the motor means.

7. A self-level winder as defined in claim 1, characterized in that the strain-gauge circuit means comprises a strain-gauge bridge circuit that provides output signals to an amplifier that drives a servo-control valve that in turn controls the operation of the motor means.

8. A self-level winder as defined in claim 1, characterized in that the beam means comprise first and second parallel beams,
   the rollers comprising vertically oriented bars that are rotatably secured at each of their ends in the spaced beams,
   and ones of the adjacent ends of the beams being substantially rigidly attached to the carriage means for holding the beams in alignment with the spool.

9. A self-level winder as defined in claim 8, characterized in that the first pair of roller bars have spools mounted thereon that fit the outer circumference of the line passing therethrough, providing positive contact with both sides of the line.

* * * * *